Nov. 23, 1965  R. E. JOSEY  3,219,995
ANALOG-TO-DIGITAL CONVERTER
Filed April 3, 1961  4 Sheets-Sheet 1
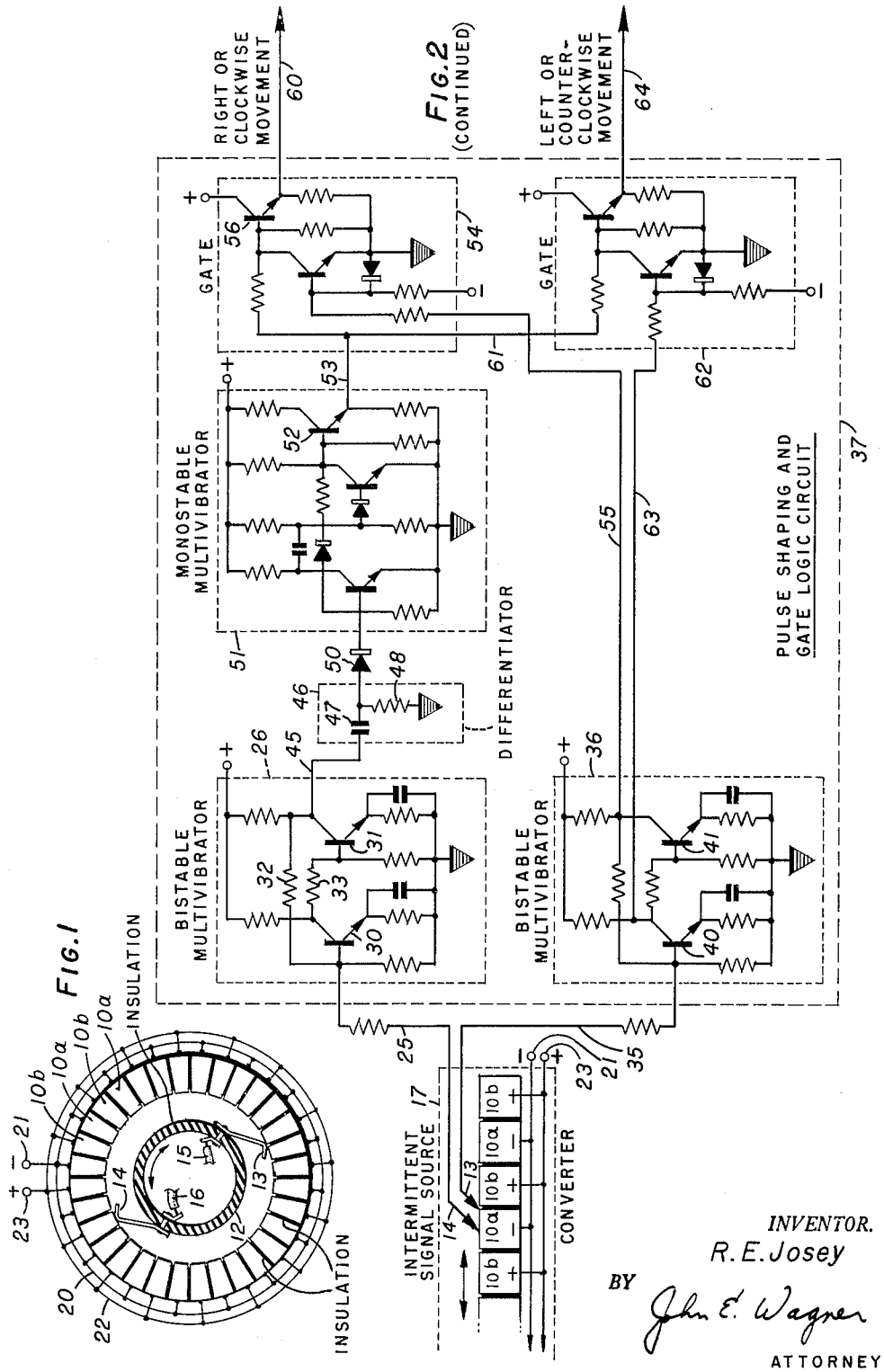
INVENTOR.
R. E. Josey
BY John E. Wagner
ATTORNEY

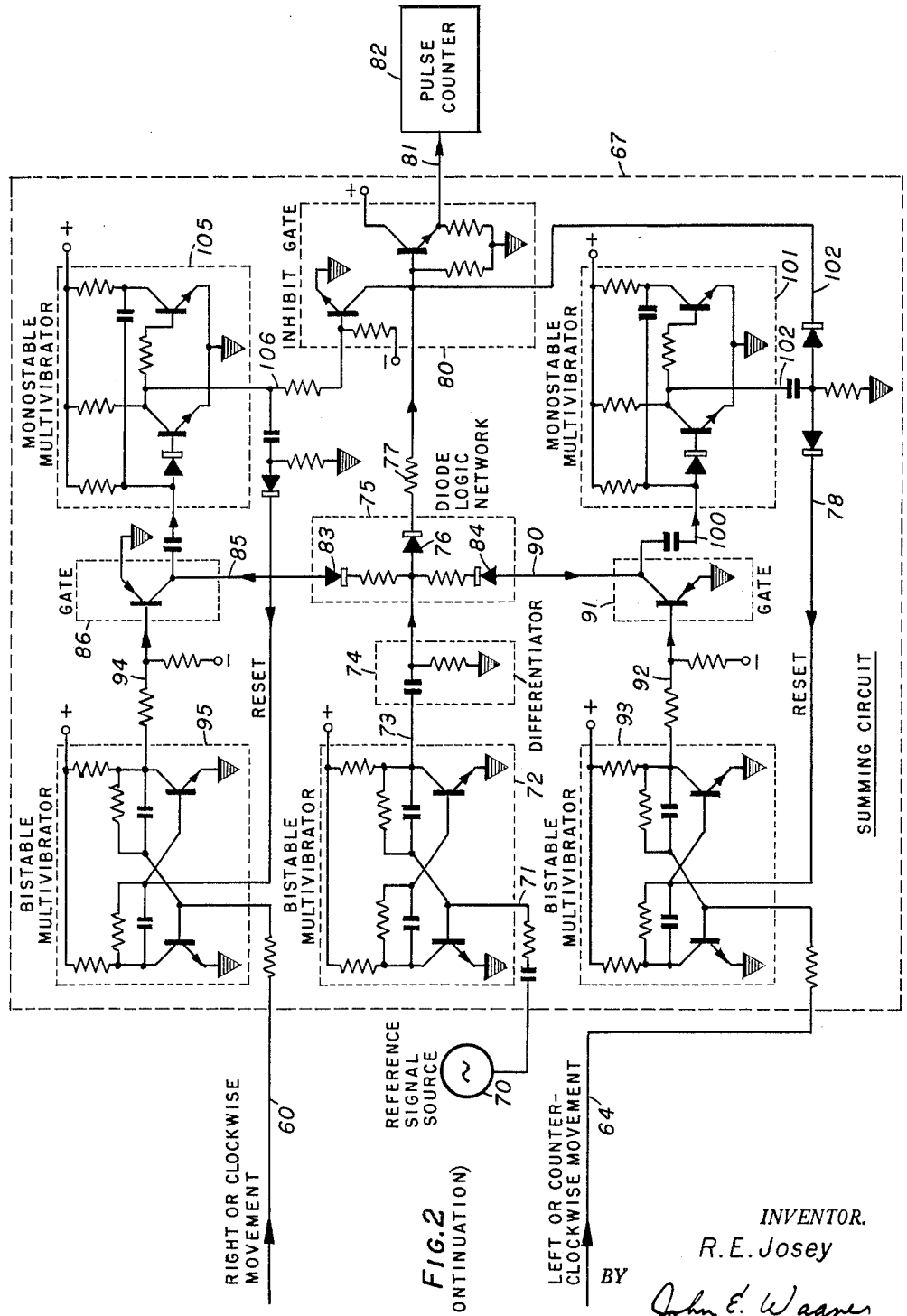

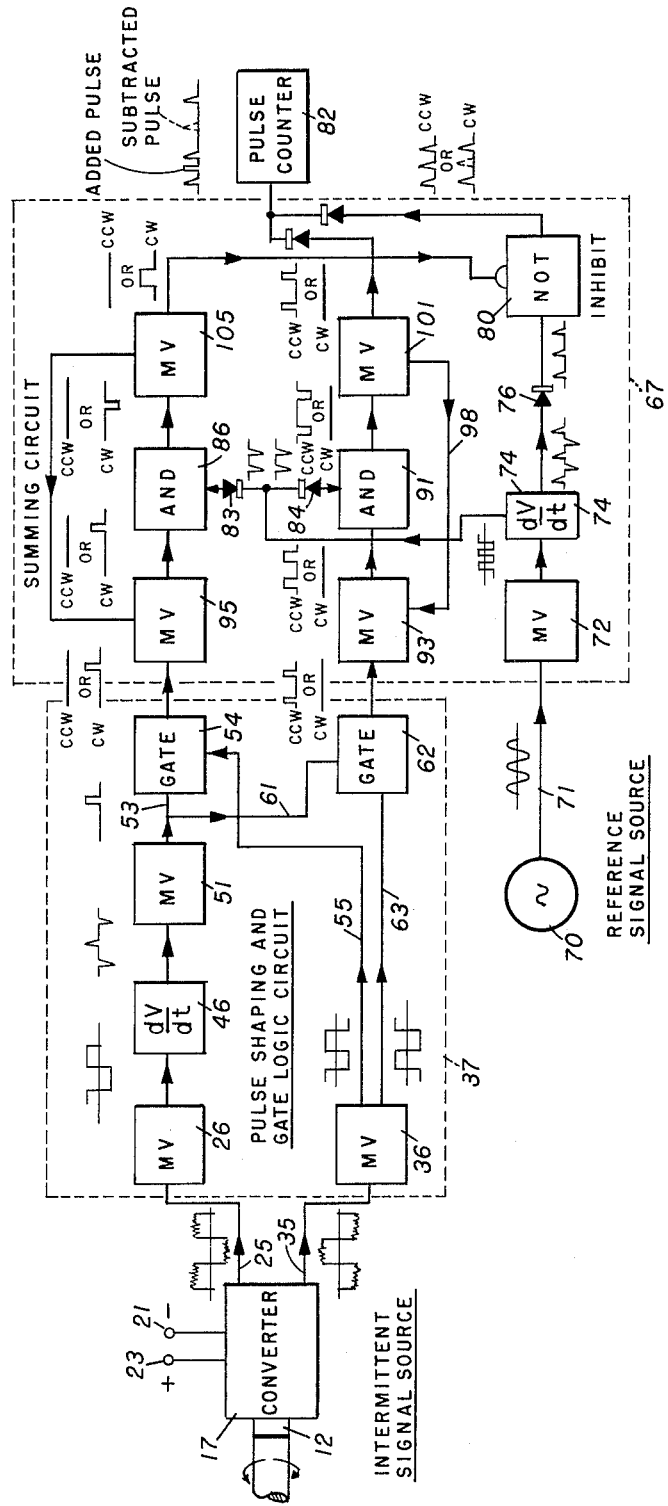

Nov. 23, 1965     R. E. JOSEY     3,219,995
ANALOG-TO-DIGITAL CONVERTER
Filed April 3, 1961     4 Sheets-Sheet 4
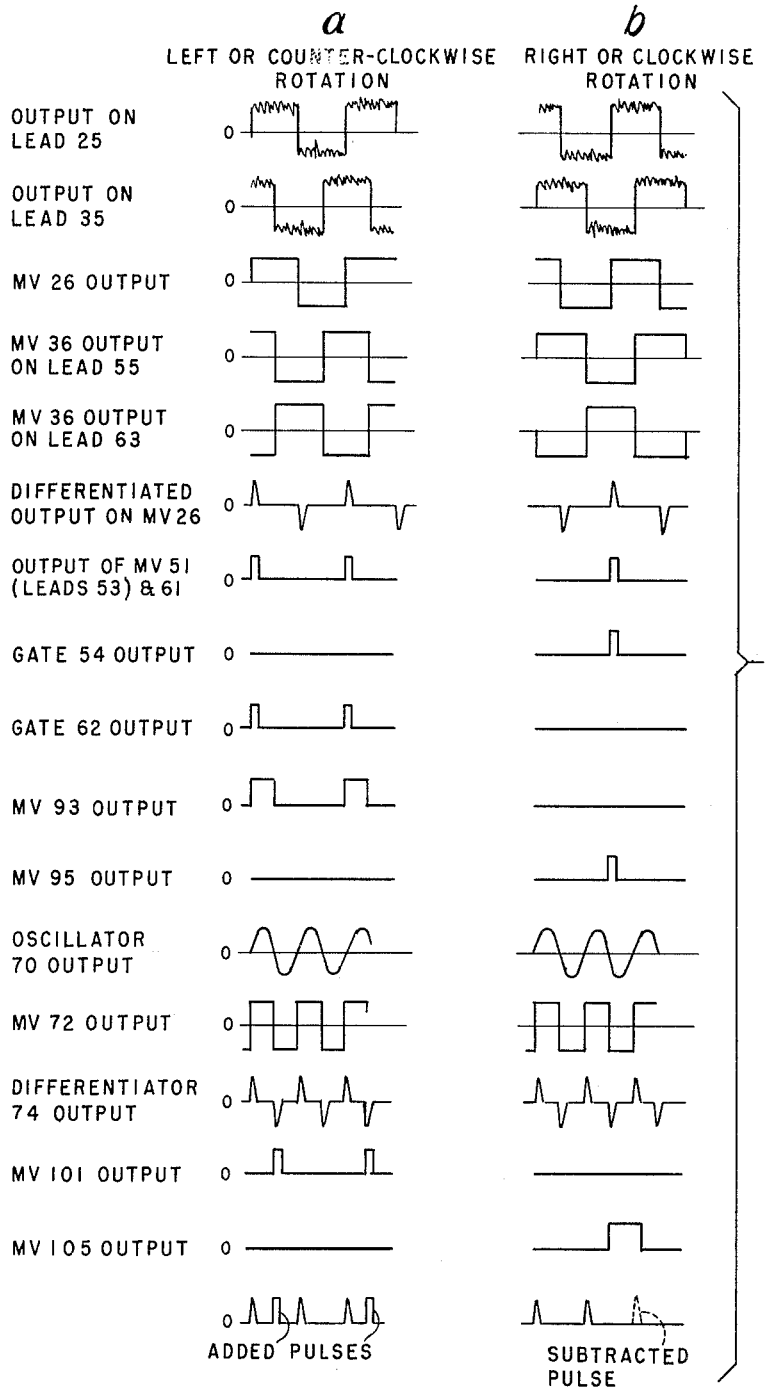
INVENTOR.
R. E. Josey
BY John E. Wagner
ATTORNEY United States Patent Office 3,219,995
Patented Nov. 23, 1965

1

3,219,995
ANALOG-TO-DIGITAL CONVERTER
Roy E. Josey, Canoga Park, Calif., assignor to The Bendix Corporation, North Hollywood, Calif., a corporation of Delaware
Filed Apr. 3, 1961, Ser. No. 100,291
7 Claims. (Cl. 340—347)

This invention relates to information-handling systems, and more particularly to circuits for digitizing and summing analog information such as the displacement of a rotating shaft.

The continual need exists for simple, low cost and reliable analog-to-digital converters. Simplicity and low cost can easily be realized in rotating shaft-displacement indicators by the use of an array of commutator bars and brushes to ascertain the angular displacement of a shaft by counting the number of voltage pulses produced with movement from a known position.

The reliability of this simple system at high speeds is limited because brush noise and bounce may generate false pulses or hide valid ones. Consequently this simple and otherwise satisfactory system is often replaced at the sacrifice of cost and simplicity by noncontacting systems, such as photoelectric converters cooperating with a code disk attached to the rotating shaft.

Also, shaft-rotation indicators give no indication of the direction of movement or the total displacement of the shaft. The need also exists for a simple displacement indicator with a contacting type digitizer in systems in which the rotating member may be subject to rotation in either direction either at random or constant rates.

To determine the shaft displacement, it is essential that the count of pulses resulting from rotation in one direction be subtracted from that of the other direction. It is highly desirable that this operation be performed by the converter system itself, so that a simple one-direction counter may be used to represent total incremental displacement.

Also, where this source of random pulses and an additional source of pulses are both connected to a one-direction counter, there is a danger that pulses from both sources may arrive simultaneously and be counted as a single pulse. Therefore a need also exists for protection against the loss of coincident pulses in such dual information source systems.

With these statements of the needs of the art in mind, it is a general object of this invention to provide an analog-to-digital converter of the brush-commutator or contacting type which is insensitive to brush noise or bounce.

Another object is to provide such a converter in combination with a logic network operative to indicate direction, as well as magnitude, of rotation.

A further object is to provide a system which responds to a plurality of information sources without the danger of lost pulses owing to coincident arrival at the counting stage.

These objects are all accomplished in accordance with this invention, one embodiment of which comprises a converter coupled to a rotatable shaft and including a plurality of commutator segments and a pair of brushes mounted for relative rotation with the brushes spaced apart a distance that is an odd multiple of the half width of a commutator bar. Successive commutator bars are connected to voltage sources of opposite polarity so that each brush undergoes a voltage reversal on passing from bar to bar.

The two brushes are connected to respective bistable multivibrators of the type responding to voltage reversals to switch conductive states. The outputs of the bistable multivibrators form a part of a logic circuit including a pair of gates, one or the other of which is rendered conductive dependent upon the sequence of voltage reversals on the two brushes.

When the shaft advances one commutator segment distance in a clockwise direction, a single pulse appears at the output of one gate, and when the shaft moves a similar increment in the opposite direction, a single pulse appears at the output of the second gate. Therefore, both magnitude and direction of shaft movement are sensed. Where the total displacement of the shaft from a reference position is desired, the two gates are connected to a counter respectively as add and subtract inputs.

An analog-to-digital converter and a second information source can be connected to a single counter, utilizing another aspect of this invention. In this other aspect, the second signal source is connected through a differentiator which produces a primary voltage spike coincident with the leading edge of each pulse and a complementary voltage spike coincident with the trailing edge. The primary voltage spike is passed through a forwardly-poled diode to the counter to register as an incoming pulse. The complementary pulse is diverted through reversely-poled diodes as the enabling inputs to two gates in series respectively with the add and subtract inputs to the counter. With this connection, the add and subtract inputs to the counter are enabled at intervals between the pulses from the second source. No coincidence and loss of pulses can occur.

If the subtract input from the first converter is connected to temporarily disable the second converter for one pulse it can thereby, in effect, subtract a pulse. Employing this arrangement, the counter need only be a simple add pulse counter without provision for subtraction.

One feature of this invention is the utilization of a contact type shaft position indicator employing a number of commutator segments and a pair of brushes wherein the successive commutator segments are connected to voltage sources of opposite polarity, and the wipers form respective inputs to bistable multivibrators responding only to voltage reversals.

Another feature of this invention involves the cross-connection of both of the bistable multivibrators to a pair of transmission gates whereby the sequence of voltage transition by the pair of brushes indicates the direction of movement and appears as an output pulse on one or the other of the transmission gates.

Still another feature of this invention involves the connection of a pair of pulse information sources to a common counter wherein one pulse information source is connected to a differentiator to produce primary and complementary voltage spikes and the primary spike is handled as an information pulse and the complementary spike is used as an enabling input for the second information source whereby the introduction of information from the two sources is synchronized.

A complete understanding of these and other features of this invention may be gained by reference to the following detailed description along with the accompanying drawings, in which:

FIG. 1 is a vertical section through a shaft position digitizer employed in the invention;

FIG. 2 is an electrical schematic diagram of one embodiment of this invention;

FIG. 3 is a block diagram of the embodiment of FIG. 2; and

FIG. 4 is a graphical representation of waveforms in significant portions of the circuit of FIGS. 2 and 3.

*Converter*

Referring now to FIG. 1, the converter employed in this invention comprises basically a number of commutator bars 10a and 10b in a cylindrical stator array and surrounding a rotatable shaft 12, in this case a hollow dielectric tube section, carrying a pair of contact elements in the form of resilient conductive wipers 13 and 14 connected to respective leads 25 and 35. One set of alternate commutator bars 10a are all connected via a bus 20 to a negative voltage source 21, while the other set of alternate commutator bars 10b are all connected together through bus 22 which, in turn, is connected to a positive voltage source 23.

The tube 12 is coupled to a shaft, the rotational displacement of which is desired to be metered, and which rotates in either the clockwise or counterclockwise direction with the shaft to which it is attached. With each increment of shaft movement, the wipers 13 and 14 are connected in sequence to sources 21 and 23 of positive and negative voltage. The wipers 13 and 14 as shown in FIG. 1 are nearly opposite each other on the tube 12. It is merely necessary that they be displaced by an odd number of one-half commutator bar widths from each other so that upon shaft movement the voltage transitions of the brush 13 are displaced from the voltage transitions of brush 14 by one-half commutator bar. With the shaft and tube 12 rotating in either direction at a constant rate, the square waves generated by the movement of brushes 13 and 14 will be 90° out of phase.

The particular construction of the converter FIG. 1 is purely illustrative since the commutator bars may be affixed to the central shaft and the wipers ride on their outer surface as in conventional motor practice, or the arrangement shown may be used. The essential characteristic of the converter is that the alternate sets of commutator bars 10a and 10b are connected to voltage sources of opposite polarity and that the brushes are spaced at a one-half commutator bar interval apart, or an add number of the half commutator bar interval.

As shown in FIG. 2, both wipers 13 and 14 are in contact with a bar 10a and at a negative polarity, with movement thereof to the left from the position shown; first the brush 13 and then the brush 14 change from a negative to a positive voltage. With movement in the opposite relative direction, both brushes 13 and 14 will remain at a negative voltage until brush 14 leaves the edge of commutator bar 10a, after which it will contact the next adjacent bar 10b and undergo a change to a positive potential to be followed by the brush 13 one-half increment later.

*Pulse shaping and gate logic circuit*

The brush 14 is connected via lead 25 to a bistable multivibrator 26 made up of a pair of transistors 30 and 31 with the base electrodes of each directly coupled through a resistor 32 or 33 to the collector electrode of the opposite transistor. Direct interconnection in this manner requires a change of polarity of the base electrode of transistor 30 in order to produce a change in state of the multivibrator 26. As shown with brush 14 at a negative potential, the base-emitter circuit of transistor 30 is back-biased and therefore the transistor 30 is cut off and the positive potential of the collector of transistor 30 forward biases the base circuit of transistor 31 holding it in conductive saturated condition. The brush 13 is connected through a lead 35 to a bistable multivibrator 36 identical with the multivibrator 26. As shown, the brush 13 like brush 14 is at a negative potential, so that a transistor 40 of multivibrator 36 is cut off and a transistor 41 is in a conductive condition.

The polarity reversals of voltage on brushes 13 and 14 cause the multivibrators 26 and 36 to change state.

The output from multivibrator 26 is taken from the collector of transistor 31 by a lead 45 which connects it to a differentiating network 46 made up of a series capacitor 47 and a shunt-resistor 48. The output of the differentiating network 46 is conducted through a diode 50 to a monostable multivibrator 41, which produces one output pulse, time-related to the leading edge of each positive voltage excursion of the bistable multivibrator 26. The multivibrator 51 includes an emitter follower output stage 52 which is connected via lead 53 to a gate 54. A second input to the gate 54 is over lead 55 from the collector circuit of transistor 41 in multivibrator 36. As so connected, a transistor 56 of gate 54 is biased to cut off unless a positive potential appears on lead 53 simultaneously with a negative pulse on lead 55. Such coincidence occurs only upon clockwise rotation and results in the appearance of an output pulse on lead 60 from the emitter circuit of transistor 56. The emitter follower stage 52 of multivibrator 51 is also connected through leads 53 and 61 to a gate 62 as one of its inputs. A second input to gate 62 is over lead 63 from the collector of transistor 40 of multivibrator 36. The gate 62 produces an output on the lead 64 only when a positive voltage appears on lead 61 and simultaneously a negative pulse appears on lead 63. This condition occurs upon counter-clockwise rotation.

The two brushes 13 and 14, therefore, through their respective bistable multivibrators 36 and 26 are cross-connected to a pair of gates 54 and 62, in the above described manner, so as to produce a pulse on the output lead 60 when a voltage transition has occurred upon movement of the brushes 13 and 14 to the right in the drawing relative to the commutator bars 10a and 10b and to produce a positive voltage pulse on lead 64 when a voltage transition has been detected by movement of the brushes 13 and 14 to the left in the drawing relative to the bars 10a and 10b. This operation is described below in connection with FIGS. 3 and 4, but for the present it shall suffice to say that the number of pulses appearing on lead 60 indicate incremental movement in a right or clockwise direction of the shaft 12, and the number of pulses appearing on lead 64 indicate the incremental movement in the left or counterclockwise direction. Of course, the algebraic sum of the pulses equals the displacement of the shaft from the originating position. The summation is obtained, utilizing the logic circuitry in the description which follows.

The information content on leads 60 and 64 may be introduced directly into a counter capable of adding and subtracting; however, in accordance with this invention it is possible to obtain the summation of these two inputs and combine them with the output from an additional information source, all using a single direction or add only counter.

*Summing circuit*

This last result is achieved utilizing the additional information source indicated in the drawing as an oscillator or sine wave generator 70. The generator 70 may have a fixed frequency or may be modulated and therefore constitute an additional source of information. In one particular embodiment, the reference source 70 is an oscillator having a frequency of oscillation of 800 cycles per second. The output of the oscillator 70 is conducted via lead 71 to a bistable multivibrator 72 employed to produce a square wave of the same frequency. The square wave from the multivibrator 72 taken from the lead 73 is introduced into a differentiator 74 of the same configuration as the differentiator 46. A positive and a negative going spike is derived from each transition of the multivibrator 72. The positive or primary and negative or complementary voltage spikes from the differentiator 74 are introduced into a diode logic network 75. The positive going spikes pass through a forwardly poled diode 76 in the network 75, through a resistor 77 to an inhibit gate 80 which is normally in its signal conducting condition and thence through output lead 81 to a single direction pulse counter 82. With this arrangement the positive going or primary voltage spike resulting from the first positive excursion of the multivibrator 72 is introduced directly through the diode 76 and the normally signal conducting gate 80 to the pulse counter 82 as an information input.

The diode network 75 includes a pair of branch circuits having respective reversely poled diodes 83 and 84 with the diode 83 connected over lead 85 as an input to a gate 86. The reversely poled diode 84 is connected through lead 90 as an enabling input to a gate 91. Therefore, the complementary or negative going voltage spike produced by the differentiator 74 is conducted through the diodes 83 and 84 to produce enabling inputs to the gates 86 and 91, respectively. The second, or information, input to the gate 91 is over lead 92 from a bistable multivibrator 93 connected to the lead 64 which as heretofore described supplies pulses denoting left or counter-clockwise movement of the converter brushes 13 and 14.

The second or information input to the gate 86 is a lead 94 from a bistable multivibrator 95 in turn supplied by a lead 60 with pulses denoting right or clockwise movement of the brushes 13 and 14. The output of the gate 91 is introduced via a lead 100 to a monostable multivibrator 101, the output lead 102 of which is connected through a capacitor and an isolating diode as an information input to the inhibit gate 80 and therethrough to the counter 82 via lead 81. The output of gate 86 is a similar monostable multivibrator 105 connected via lead 106 as the inhibit input to the inhibit gate 80.

The circuit of FIG. 2 may be considered to be made up of two basic sections: first, the pulse shaping and gate logic circuit 37 employing the cross-connected multivibrators 26 and 36 for deriving the direction and magnitude of movement detected by the converter; and second, the summing circuit 67 for producing an output which is the function of the sum of the two inputs and the inputs from the reference source 70

*Operation*

The operation of this invention and particularly the functions of the two sections mentioned may be more clearly understood by reference to FIG. 3, a block diagram of the system, in conjunction with the waveforms of FIG. 4. The primary input to the system is the shaft 12 connected to the converter shaft 17 and subject to continuous or intermittent rotation in either a clockwise or counterclockwise direction. The converter has its pair of voltage supplies 21 and 23 of opposite polarity connected thereto and has output leads 25 and 35 on which the voltages picked up by the brushes 13 and 14 of FIGS. 1 and 2 appear. The output waveforms on leads 25 and 35 may be seen in FIG. 4 as square waves 90° out of phase and having superimposed thereon brush noise or chatter. Bouncing of the brushes at high speed can cause the voltage detected by a brush to go from the normal level to zero. As will be seen below, such a falloff of the voltage to zero is insufficient to cause a switching of the multivibrators 26 and 36, and therefore avoids the possibility of false registration of pulses. The multivibrator 26 has a square wave output corresponding to the output on lead 25, without any superimposed brush noise. The multivibrator 36 having output leads 55 and 63 from the collectors of both the transistors 40 and 41 produces two waveforms: one on lead 55 corresponding to the output on lead 35 without brush noise, and a second output on lead 63 180° out of phase with the primary output on lead 55. Both of these output waveforms from multivibrator 36 are 90° out of phase with the output of multivibrator 26, the output on lead 55 leading that of multivibrator 26 and the output on lead 63 lagging that of multivibrator 26. The output of multivibrator 26 is differentiated by network 46 producing positive spikes on the rising voltage excursion of the waveform and negative voltage spikes on the fall. The multivibrator 51 connected to differentiator 46 is triggered by the positive spikes and therefore produces short pulses, the leading edges of which coincide with the positive spikes.

Considering first the case of additive or counterclockwise rotation of the shaft 12, the gate 62 has as enabling inputs requiring a positive voltage on lead 61 and a negative voltage on lead 63 to produce an output. Comparing the waveform of leads 61 and 63, in FIG. 4a, it will be seen that a positive pulse on lead 61 occurs during the longer negative voltage excursions on lead 63. Therefore, gate 62 passes the pulses from lead 61 (in inverted form). The same pulse on lead 61 is also applied through lead 53 to gate 54 where the lead 55 constitutes a second enabling input. Comparing these two waveforms on leads 55 and 53 it may be noted that the positive voltage pulse on lead 53 occurs during the positive voltage excursion of lead 55; therefore, the gate 54 produces no output.

The multivibrator 95 is not triggered but the multivibrator 93 connected to gate 62 is triggered and switches condition and remains in the switched condition until a reset pulse occurs over lead 98 from the multivibrator 101. Since the multivibrator 101 is actually operated by a pulse originating in multivibrator 93, this last multivibrator will remain in the operated condition indefinitely until the pulse stored thereon has been registered.

At the same time that counterclockwise rotation of the shaft has produced pulses appearing at the multivibrator 93, the reference source 70 has been producing a sine wave which, in turn, is converted to a square wave by multivibrator 72. The square wave differentiated by differentiator 74 then has become a series of alternate positive and negative spikes which are segregated by the diode network 75 made up of forwardly poled diode 76 and reversely poled diodes 83 and 84. The positive or primary spikes pass through diode 76 and through the normally signal conducting gate 80 to the pulse counter 82 to register as a series of pulses. The complementary pulses from the differentiator 74 pass through diodes 83 and 84 as the second enabling inputs to the gates 86 and 91.

In the case under discussion of counterclockwise rotation where there is one enabling input at the gate 91 from the multivibrator 93, the addition of the second input through diode 84 allows a pulse to trigger multivibrator 101 thereby producing an output pulse to the counter 82. The multivibrator 105 is inactive since the gate 86 which must pass its triggering pulse lacks a second enabling input from multivibrator 95. It will be remembered that the primary pulse originating at the oscillator 70 has been introduced into the pulse counter 82. The additional pulse from multivibrator 101 has been inserted between adjacent pulses originating at the reference source 70. Consequently, the count at the counter 82 has been increased by one. This added pulse necessarily occurs between pulses from the reference source 70, since its source is triggered only by the complementary or negative going spike from the differentiated output of the reference source 70. It becomes obvious that operation at the gate 54 and the resultant generation of pulses beyond that gate indicate movement of the shaft in the positive or add direction, which is in this case counterclockwise. In a typical example, the reference source 72 generates a frequency of 800 cycles per second which is converted into 800 pulses per second. A single pulse from multivibrator 101 inserted between a pair of pulses originating at source 72 results in the count being increased during a single sound-sampling period to 801, with the 800 pulses constituting the reference and the additional pulse denoting counterclockwise shaft displacement. Any additional pulses from multivibrator 101, denoting further counterclockwise movement of the shaft 12, are likewise inserted between adjacent pulses from source 72, thereby increasing the pulse count.

The case of movement of shaft 17 in the opposite direction is illustrated in FIG. 4b. The output on leads 25 and 35 are of the same configuration as in the counterclockwise movement case and these waves remain 90° out of phase owing to the rigid positioning of the brushes 13 and 14. However, the output on lead 25 lags that of lead 35. The noisy output of these two leads is improved by the multivibrators 26 and 36 and the two waveforms are derived on leads 55 and 63 from the multivibrator 36. The output of multivibrator 26 is again differentiated and it is apparent that the position of the positive spikes has shifted as compared with the case of counterclockwise direction, and, similarly, the position of the output pulses of multivibrator 51 has shifted in relative time. The output pulses from multivibrator 51 on lead 53 are introduced into both gates 54 and 62. The requisite coincidence occurs only between the output on leads 53 and 55 which are the enabling inputs to gate 54, and two output pulses occur at gate 54. The multivibrator 95 is triggered, introducing one enabling input into gate 86. Multivibrator 93 is inactive. The oscillator 70 produces the sine wave independent of the rotation of the shaft 12. The output wave of oscillator 70 is squared by multivibrator 72 and differentiated by differentiator 74. The negative or complementary voltage spikes from the differentiator 74 provide the second enabling input to the gate 86 which, in turn, produces an output pulse at the time of the complementary pulses from differentiator 74. The output pulses of multivibrator 105 are of sufficient length to last at least three-quarters of the period of the oscillator 70. These pulses from multivibrator 105 constitute the inhibiting input to gate 80, thereby interrupting conduction of that gate for three-quarters of a cycle of the operation of oscillator 70. By interrupting the conduction of gate 80 for that period, the next succeeding primary pulses are prevented from reaching the pulse counter 82. In this manner one pulse is subtracted. In a comparable example to the one given above for counterclockwise rotation of the shaft, incremental movement in a clockwise direction producing one pulse from multivibrator 105 serves to interrupt conduction of the reference pulse train (e.g., 800 pulses per second) from reference source 72 for slightly less than one cycle. The count at the end of one second therefore is 799, the reference number, 800, less one. Thus any number of clockwise or counterclockwise increments of movement arriving at a rate of less than 800 pulses per second will be algebraically added in the single direction counter 82.

*Summary*

It may therefore be seen that in accordance with this invention a simple contacting type of converter may be used in a system which is insensitive to contact or brush noise, since the multivibrators driven by the converter are directly coupled and require a voltage reversal before reversing state. This is achieved by connecting successive commutator bars of the converter to voltage sources of opposite polarity. This first source of possible error, wiper noise, is therefore eliminated.

Next, in accordance with this invention, the direction of movement as well as amount is detected by the logic network employing the multivibrators 26, 36 and the gates 54 and 62.

The total displacement of the analog information source can be determined and compared with a reference source employing the next aspect of the invention. The information pulses from the reference source are differentiated and the positive or primary voltage spikes there derived are introduced into a single-direction counter as information inputs. The complementary pulses generated from the reference source are used to enable both the add and subtract, or counterclockwise, and clockwise, inputs from the direction-sensing logic circuitry. There is no possibility of loss of information due to coincidence of pulses from the reference source and the analog information or random source, since added pulses from this random information source are injected between the pulses from the reference source and substract pulses are used to interrupt conduction from the reference source to the counter on a pulse-per-pulse basis. Therefore, employing this invention, a single-direction counter is all that is required and in conjunction with the circuitry allows the comparison, addition and subtraction functions to be performed.

One apparent limitation in the system of this invention is that the random information source cannot have a higher information rate than the reference source, since only one pulse can be added between the reference source pulses and only one reference source pulse can be subtracted at a time. This is no serious limitation since the reference source normally has a rate far higher than the random sources. This arrangement can be used to elimated other sources of error in the system since the clock rate can be controlled and set at a valve which is considered to be the maximum information rate to which the entire system should respond. When so arranged, external sources of errors which might appear at the random information inputs are eliminated and only random information appearing at the slower rate is detected and utilized.

In the above description, the reference source is illustrated as a fixed-frequency oscillator. However, this need not be the case and the reference source may be modulated, for example, operated at 800 cycles per second, plus or minus 80 cycles per second, and thereby constitute an additional information source to the system.

Although for the purpose of explaining the invention a particular embodiment thereof has been shown and described, obvious modifications will occur to a person skilled in the art, and I do not desire to be limited to the exact details shown and described.

I claim:

1. A system for metering the movement of one member with respect to a second member in a mechanical system comprising:
 an array of commutator bars;
 first and second voltage sources of opposite polarity connected to respective alternate commutator bars;
 a pair of contacting elements positioned for movement along said array of commutator bars upon displacement of a first member with respect to a second member;
 said contacting elements positioned at substantially odd half commutator bar incremental distances along said array whereby said contacting elements undergo voltage transitions to opposite polarity in alternating sequence upon movement of the first member with respect to the second member;
 a pair of directly coupled bistable multivibrators connected to said contacting elements responsive to voltage polarity transitions thereof for producing an output pulse for each voltage transition;
 a first coincidence gate having one of said bistable multivibrators connected as one enabling input thereto and the other of said bistable multivibrators connected as the second enabling input thereto for producing a series of output pulses on one output lead proportional to the displacement of the first member with respect to the second member in one direction; and
 a second coincidence gate having one enabling input connected to said first bistable multivibrator and a second enabling input connected to a point of said second bistable multivibrator having a voltage thereon 180° out of phase with the voltage introduced into said first coincidence gate.

2. A circuit for obtaining the algebraic sum of digital information pulses from a continuous source of reference pulses and a random digital information source comprising:
 means connected to the source of reference pulses for differentiating information pulses therefrom;

a pulse counter;
a diode isolating circuit including a first diode poled to pass pulses of one polarity from said differentiating means to said counter;
said isolating circuit including a second diode poled to pass pulses from said differentiating means of opposite polarity from pulses passed by said first diode; and a transmission gate;
said second diode connected as an enabling input to said transmission gate;
the source of random pulses connected as a second enabling input to said transmission gate;
the output of said transmission gate connected as an information input to said pulse counter;
whereby information from said reference source introduced into said counter at a time interval determined by the voltage excursion of one polarity of the differentiated reference source pulse and information from the random source is introduced into the counter at a time interval determined by the voltage excursion of opposite polarity of the differentiated reference source pulse.

3. The combination in accordance with claim 2 for obtaining algebraic sums of pulses from the reference and random source and a second random source of pulses to be subtracted including:
a second transmission gate;
third diode means in said isolating circuit connected as an enabling input to said second transmission gate;
means connecting said second random pulse source as a second enabling input to said second transmission gate;
the output of said second transmission gate being connected as a disabling input to the connection between said reference pulse source and said counter;
whereby information from said second random source temporarily interrupts the introduction of pulses from said reference source on a pulse-per-pulse basis, and thereby effectively subtracts pulses.

4. A circuit for obtaining the algebraic sum of digital information pulses from two sources including a first source having a pulse repetition rate substantially greater than the second source comprising:
means for differentiating pulses from said first pulse source;
means for isolating the differentiation products from said pulses of one polarity from the differentiation products of opposite polarity;
a counter;
means introducing the differentiation product of one polarity into said counter to advance said counter incrementally;
a transmission gate providing an output upon selected conditions of a pair of input terminals;
means introducing the differentiation product of opposite polarity into one input terminal of said transmission gate to establish the selected condition of said one terminal;
means introducing pulses from the second source of pulses into the second input terminal of said transmission gate to establish the selected condition of said second input terminal;
and means connecting the output of said transmission gate to said counter.

5. A counting system comprising:
a unidirectional counter;
a first source of pulses for said counter to constitute the basic information source for said counter;
means for differentiating pulses from said first source;
means for segregating the differentiation products of one polarity from the differentiation products of opposite polarity;
means introducing the differentiation products of one polarity into said counter to provide the basic count;
a source of additive count correction pulses;
a transmission gate providing an output pulse upon selected input conditions of a pair of input terminals;
said source of additive pulses connected to one input of said transmission gate;
means introducing the differentiation products of opposite polarity into the second input terminal of said transmission gate;
and means connecting the output of said transmission gate to said counter.

6. The combination in accordance with claim 5 including:
a source of subtractive count correction pulses;
a second transmission gate providing an output pulse upon selected coincident conditions of a pair of input terminals;
said source of subtractive pulses connected to one input of said second transmission gate;
means introducing the differentiation product of opposite polarity into the second input terminal of said second transmission gate;
the output of said second transmission gate being operative to temporarily disable the introduction of information from said first source of pulses to said counter to effectively subtract from the count registered in said counter.

7. The combination in accordance with claim 5 wherein said source of additive correction pulses comprises a commutator including a plurality of conductive bars, a pair of brushes positioned for movement along said bars to provide voltage pulses upon the advance of said brushes from one to the next conductive bar, means responsive to one order of voltage transition of said brushes for generating additive correction pulses.

References Cited by the Examiner
UNITED STATES PATENTS

| 2,656,106 | 10/1953 | Stabler | 340—347 |
| 2,685,082 | 7/1954 | Beman et al. | 340—347 |
| 2,733,430 | 1/1956 | Steele | 340—347 |
| 2,796,598 | 6/1957 | Cartwright | 340—347 |

MALCOLM A. MORRISON, *Primary Examiner.*

IRVING L. SRAGOW, *Examiner.*